LOUIS J. KABELL
HOWARD E. MURPHY
WALTER B. GUGGI
INVENTORS

BY
Flehr and Swain
ATTORNEYS

Jan. 9, 1962 L. J. KABELL ETAL 3,016,428

ROTARY HEAD DRIVE CONTROL MECHANISM AND CIRCUITRY FOR RECORDING MAGNETIC TAPE RECORDING AND/OR REPRODUCING APPARATUS

Filed Aug. 4, 1958

6 Sheets-Sheet 2

LOUIS J. KABELL
HOWARD E. MURPHY
WALTER B. GUGGI
*INVENTORS*

BY

Flehr & Swain
ATTORNEYS

Jan. 9, 1962 L. J. KABELL ETAL 3,016,428

ROTARY HEAD DRIVE CONTROL MECHANISM AND CIRCUITRY FOR RECORDING MAGNETIC TAPE RECORDING AND/OR REPRODUCING APPARATUS

Filed Aug. 4, 1958 6 Sheets-Sheet 3

LOUIS J. KABELL
HOWARD E. MURPHY
WALTER B. GUGGI
*INVENTORS*

BY Flehr and Swain
ATTORNEYS

LOUIS J. KABELL
HOWARD E. MURPHY
WALTER B. GUGGI
*INVENTORS*

BY
Flehr and Swain
ATTORNEYS

Jan. 9, 1962 L. J. KABELL ETAL 3,016,428

ROTARY HEAD DRIVE CONTROL MECHANISM AND CIRCUITRY FOR RECORDING MAGNETIC TAPE RECORDING AND/OR REPRODUCING APPARATUS

Filed Aug. 4, 1958 6 Sheets-Sheet 5

LOUIS J. KABELL
HOWARD E. MURPHY
WALTER B. GUGGI
*INVENTORS*

BY

Flehr and Swain

ATTORNEYS

LOUIS J. KABELL
HOWARD E. MURPHY
WALTER B. GUGGI
INVENTORS
BY
Flehr and Swain
ATTORNEYS 3,016,428

ROTARY HEAD DRIVE CONTROL MECHANISM AND CIRCUITRY FOR RECORDING MAGNETIC TAPE RECORDING AND/OR REPRODUCING APPARATUS

Louis J. Kabell, Palo Alto, Howard E. Murphy, Redwood City, and Walter B. Guggi, Palo Alto, Calif., assignors to Ampex Corporation, Redwood City, Calif., a corporation of California Filed Aug. 4, 1958, Ser. No. 752,779
9 Claims. (Cl. 179—100.2)

This invention relates generally to magnetic tape recording and/or reproducing apparatus, and more particularly to magnetic tape recording and/or reproducing apparatus suitable for recording signal intelligence over a relatively wide frequency range, including, for example, color video signals.

In copending applications Serial No. 524,004, filed July 25, 1955, and Serial No. 427,138, filed May 3, 1954, there is disclosed a system and apparatus making use of rotary head assembly for recording and/or reproducing signal intelligence which occupies a relatively wide frequency spectrum. The head assembly employs one or more transducer units or heads which are mounted to rotate and sweep across a pliable tape-like medium, such as that which is commonly known as magnetic tape. A concave guide serves to hold the tape in a cupped condition to conform to the sweep path of the transducer units and to guide the same past the units whereby they make continuous contact with the tape as they sweep across the same. The head assembly and magnetic tape are driven in such a manner as to assure proper speed or rotation of the head assembly and of the tape past the heads whereby proper tracking of the heads with the recorded track portions during playback is achieved.

Systems of the above character necessarily involve separate recorded track portions extending across the tape, each track portion being formed by the sweep of a transducer unit. During playback, current variations provided by each transducer unit as it sweeps across the tape are combined tot form a composite signal corresponding to the original recorded signal.

One practical advantage of a system of the character described is the recording and/or reproduction of monochrome and color television program signal intelligence.

As is well known, a portion of the color information in a composite NTSC color signal is in the form of phase modulation of a 3.58 mc. subcarrier. Any timing errors introduced by the recording and reproducing process leads to degradation of the reproduced color signal. Timing errors may be classified for purposes of convenience as "time rate errors" and "time displacement errors."

Generally, time rate errors are introduced by having different driving frequencies supplied to the motor which drives the rotating head assembly during recording and reproduction.

Time displacement errors are introduced by changes in torque loads to which the rotary head motor is subjected. These torque loads may arise from friction of the recording heads against the magnetic tape as they sweep across the same, friction in the bearing assembly, and friction in the slip ring assembly which transfers the signal between a rotating head assembly and a stationary assembly. Time displacement errors may also be caused by phase and frequency variations of drive voltage.

When recording and reproducing a composite NTSC color signal, the time displacement errors are equivalent to phase modulation of the output signal. This results in the introduction of the errors in the reproduced color signal.

It is a general object of the present invention to provide a magnetic tape recording and/or reproducing apparatus in which time displacement errors are minimized.

It is another object of the present invention to provide a magnetic tape recording and/or reproducing apparatus in which the motive means for the rotary head assembly is driven from a stable frequency source.

It is another object of the present invention to provide a magnetic tape recording and/or reproducing apparatus in which the torque load on the motive means driving the rotary head is maintained substantially constant.

It is another object of the present invention to provide a magnetic tape recording and/or reproducing apparatus in which the motive means for the rotating head assembly is made part of a servo loop which controls the torque load on the same.

It is another object of the present invention to provide a magnetic tape recording and/or reproducing apparatus in which an eddy current brake serves to vary the torque load on the motive means driving the rotary head assembly, and in which an electrical signal indicative of the speed of rotation of the head assemblies is derived and employed to form a control signal for controlling the eddy current brake.

These and other objects of the invention will become more clearly apparent from the following description when taken in conjunction with the accompanying drawings.

Referring to the drawing.

Figure 1:
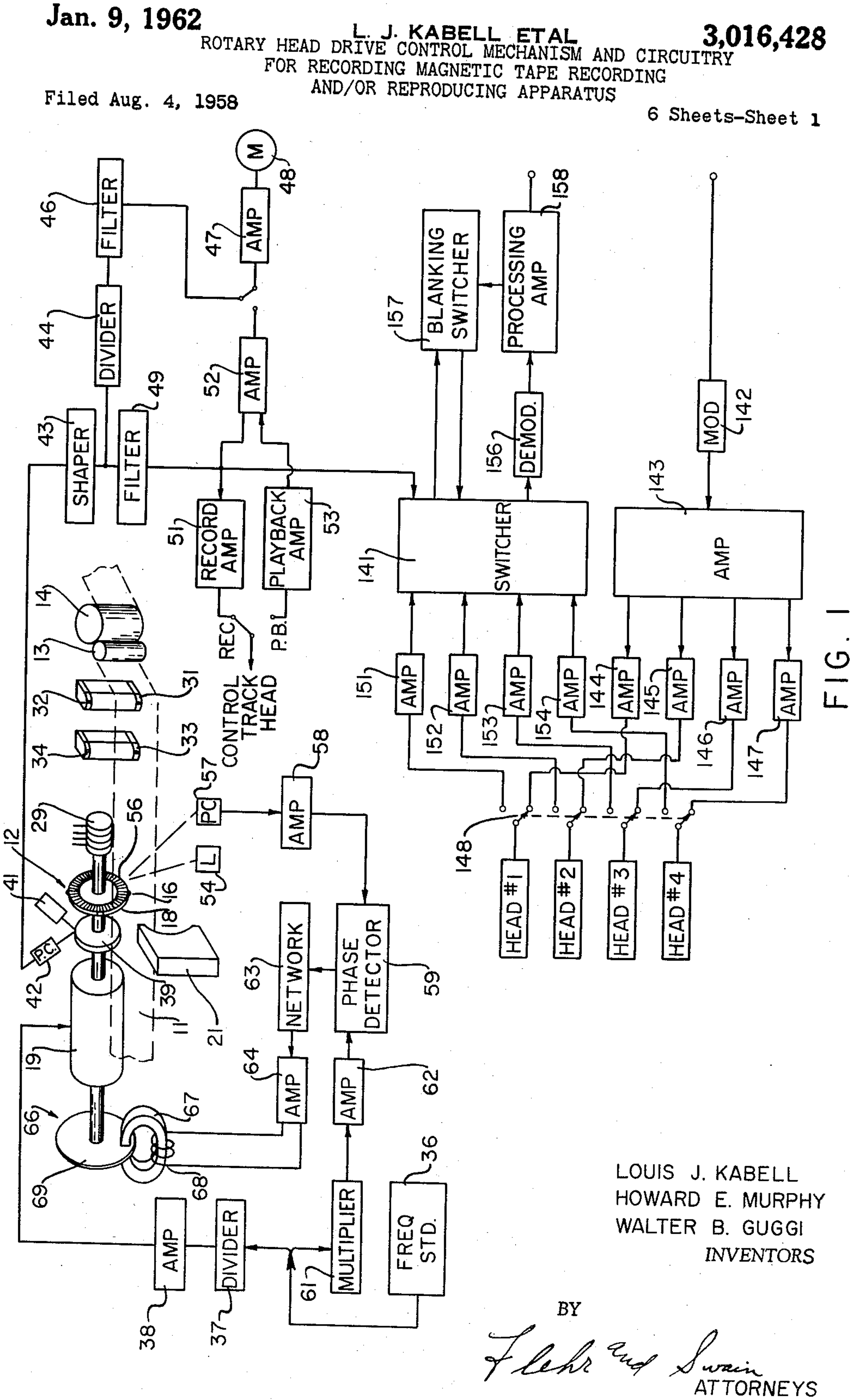
FIGURE 1 is a block diagram schematically illustrating magnetic tape recording and/or reproducing apparatus in accordance with the present invention.
Figure 2:
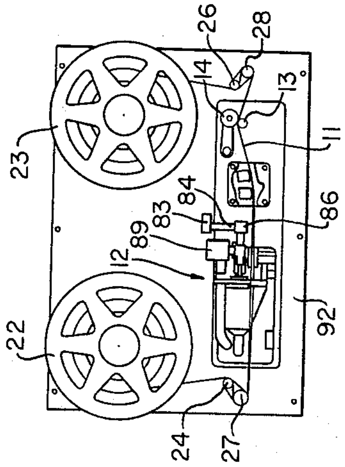
FIGURE 2 is a plan view illustrating a suitable tape transport assembly.
Figure 7:
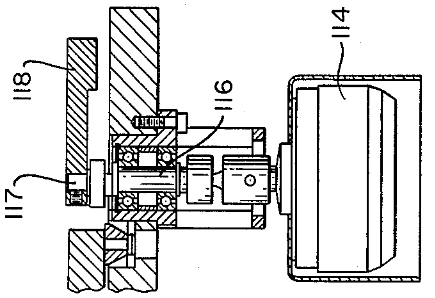
FIGURE 7 is a sectional view taken along the line 7—7 of FIGURE 3.

Referring to FIGURES 1 and 2, the magnetic tape 11 is driven lengthwise past the transducing head assembly designated generally by the reference numeral 12 by means of a capstan drive 13 acting in conjunction with a capstan idler 14. A plurality of transducing heads or units 16 are carried on the periphery of a rotary disc or drum 18 which is driven by a synchronous motor 19. Suitable guide means 21 serve to cup the tape at is is drawn past the transducing units. The tape is placed in continuous pressure contact with the transducer units 16 as they sweep through a circular path. The tape 11 is supplied from a supply reel 22 and wound onto a take-up reel 23 and is guided past the transducing head assembly by self-aligning guide posts 24 and 26, and rollers 27 and 28. The supply and take-up reels may be carried on turntables in accordance with customary practice and suitable motors may be provided for the turntables.

In operation, one head is always in contact with the tape. The heads are connected to the electronic elements of the system by a commutator 29 schematically illustrated in FIGURES 1 and 2. The commutator may, for example, include slip rings connected to each of the heads and stationary brushes serving to make sliding contact with the associated rings.

During recording of a signal intelligence, the rotational velocity of the head drum 18 and of the capstan 13 is maintained with specified relationship. During the reproducing process, the relationship of rotational velocity of the head drum 18 and capstan 13 is maintained the same as during recording within narrow limits. For this purpose, a control signal is recorded on a control track along the lower edge of the tape by the magnetic transducing device 31. The control signal is recorded as a control track during recording and during reproduction it is reproduced, amplified and used to control the relative speeds of the drum and capstan drive in a manner to be presently described in detail. A recording head 32 serves to record the sound information on the other side margin of the tape. Sound and control track erase heads 33 and 34 may precede the heads 31 and 32, respectively.

The electronic circuitry illustrated in the block diagram of FIGURE 1 may be divided into speed control circuitry and signal electronic circuitry. For a clear understanding of the invention, the two circuits are separately described. A standard frequency is employed for driving the apparatus during record and reproduce operations.

The standard frequency source 36 for recording is preferably the 3.58 mc. subcarrier frequency of the program being recorded. This signal may be obtained directly from the broadcast sync generator or from the color burst. It is, of course, to be understood that the signal may be derived from a crystal controlled oscillator which operates within the F.C.C. requirements for color broadcast. During playback the standard frequency is obtained from a sync generator which is available in the recorder and which operates within F.C.C. requirements.

The frequency source 36 includes suitable dividers to provide a standard signal of desired frequency. The signal frequency may then be applied to a divider 37 to derive a 240 cycle signal which is applied to the amplifier 38 which is preferably a three phase power amplifier suitable for driving a three phase synchronous motor 19. As previously described, the motor 19 drives the head drum 18 which carries the transducer unit 16.

Figures 10, 11:
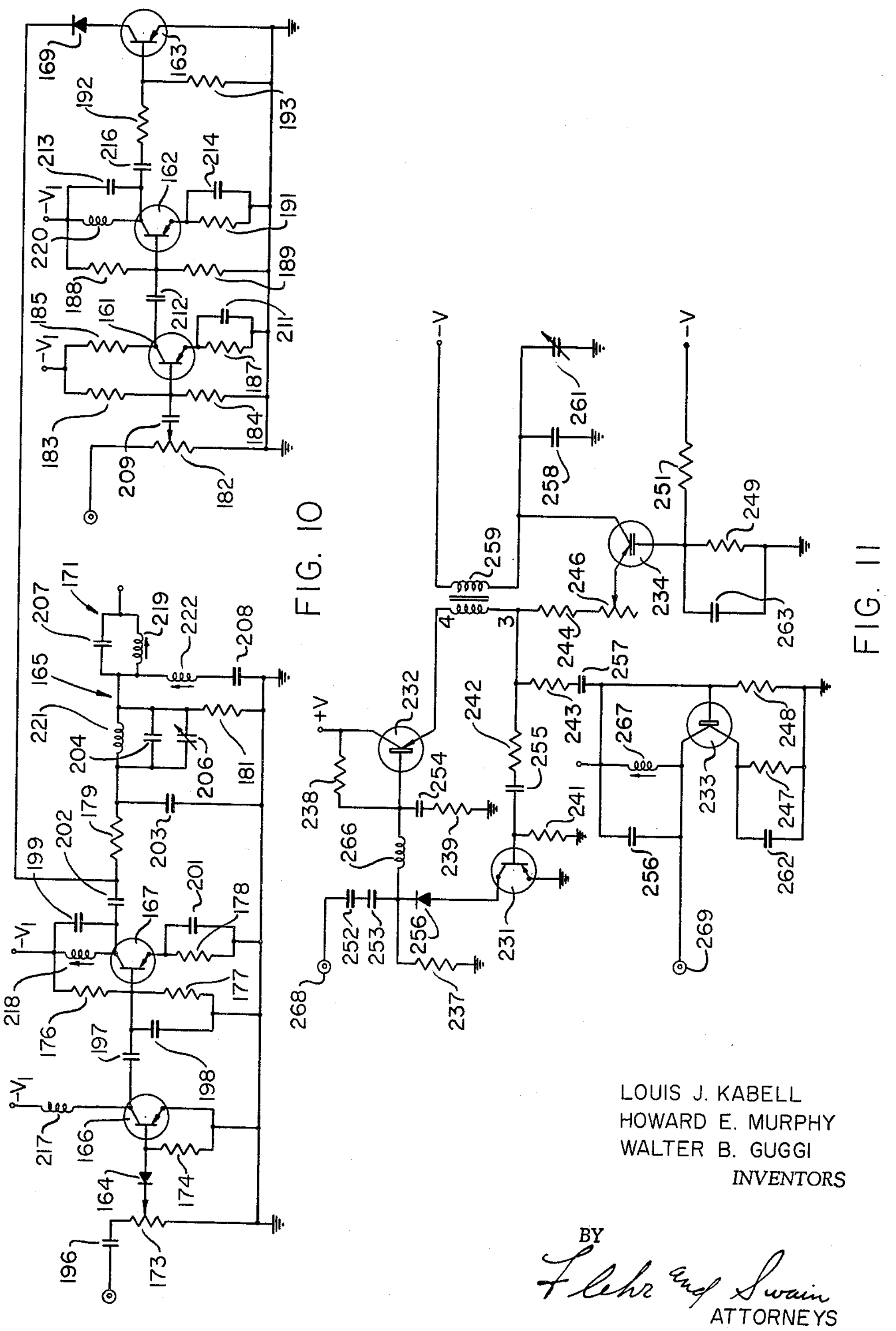
FIGURE 10 is a circuit diagram of a suitable head position error detecting circuit.
FIGURE 11 is a circuit diagram of a suitable phase controlled oscillator for providing a stable driving signal frequency.
Figure 12:
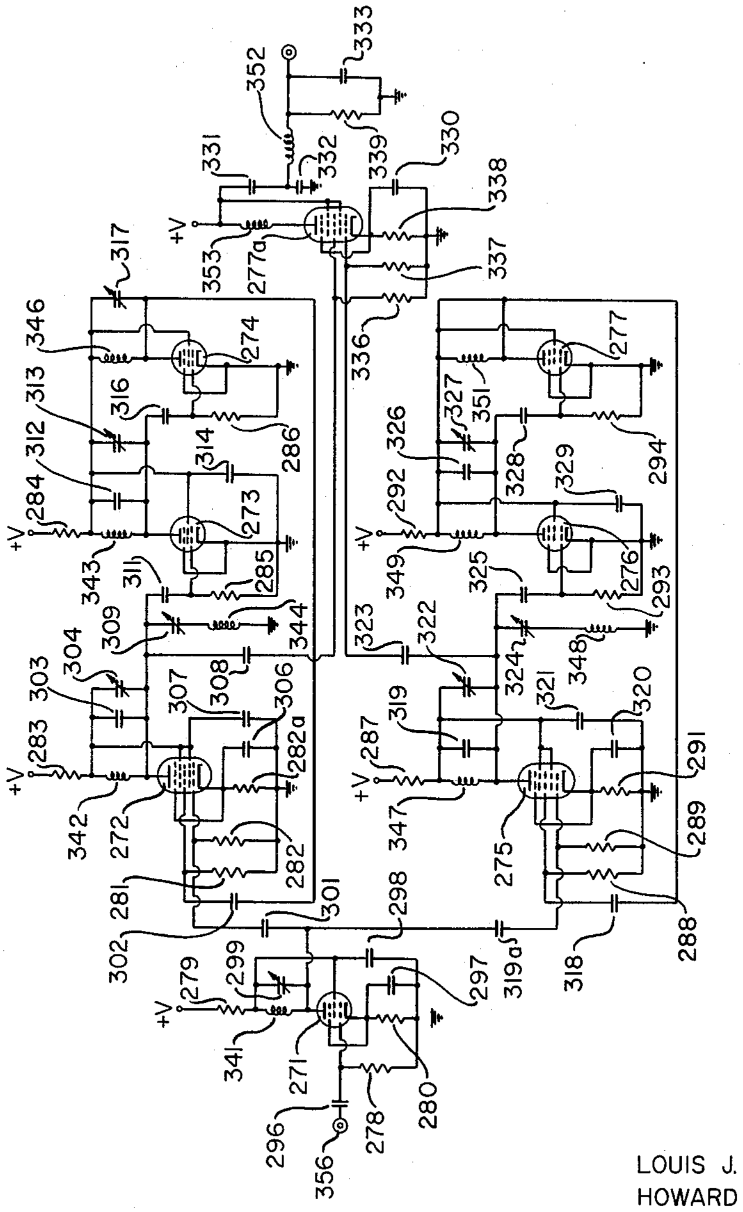
FIGURE 12 is a circuit diagram of a suitable regenerative divider circuit for providing a stable driving signal frequency.

A suitable frequency divider 37 is illustrated in FIGURE 12 and will be presently described in detail. It is also apparent that an automatic phase controlled oscillator can be employed in which the reference frequency is compared and serves to control the frequency of operation of the oscillator. Such an oscillator is illustrated in FIGURE 11 and will be presently described in detail.

When recording monochrome information the timing reference or signal frequency may be provided from the 60 cycle frequency of the power line or by picture synchronizing signals of the monochrome program. Either of these sources have permissible timing variations; however, for recording color information these sources have excessive timing variations. As previously described, accurate timing reference for color recording may be provided by the 3.58 mc. color subcarrier signal associated with the standard NTSC color television signal. The timing reference signal may be derived either from the color subcarrier bursts on incoming program material, or from the 3.58 mc. crystal oscillator associated with the color synchronizing generator equipment.

When color program material is to be recorded at a location remote from the origin, the color subcarrier burst on the color signal may be used to synchronize a local 3.58 mc. oscillator which then acts as the frequency standard for the local synchronizing generator equipment.

A revolving disc 39 coated half black and half white is carried by the motor shaft. A suitable light source 41 is focused on the disc and the reflected light is received by a photocell 42. The output of the photocell is approximately a squarewave having a frequency equal to the rotational velocity of the motor 19. For the example cited, the output squarewave signal has a frequency of 240 cycles.

The output of the photocell 42 is passed through a shaper 43 and applied to a frequency divider 44 which serves to divide down the frequency. In the instant example, the divider 44 divides by 4 to provide a 60 cycle frequency to the filter 46. The filter 46 is preferably a band pass filter which forms an output signal of substantially sinewave form. During the record operation, the output of the filter 46 is applied to an amplifier 47 and is employed to drive the capstan drive motor 48. Thus, the motor is driven at a rotational velocity which is directly related to the rotational velocity of the head drum 18. In essence, the capstan is enslaved to the head drum. The tape moves a predetermined distance lengthwise during each complete revolution of the head drum.

The output from the shaper is also applied through a filter 49 to a control track amplifier 51 which supplies its ouptut signal to the control track record head 31 during a recording operation.

During reproduction, the timing reference signal previously described is again applied to the divider 37, amplified and fed to the synchronous motor 19. The motor drives the head drums at the correct rotational velocity for the purpose of reproducing the previously recorded transverse record. The photocell again derives a signal which is shaped and passed through the filter 49. The signal from the filter 49 is fed to a phase comparator and the capstan servo amplifier 52. A second signal is applied to the phase comparator from the control track amplifier 53 which is connected to receive the output signal from the control track during the reproduction. The comparator produces a resultant signal whose D.C. component is proportional to the phase difference between the signal from the control track and that from the photocell. This signal is applied through a filter to the grid of a reactance tube which is one of the frequency determining elements of the conventional Wein bridge oscillator. The oscillator functions normally at the recording frequency (in the illustrative example, 60 cycles), but the frequency is modified up or down by the signal from the phase comparator. The output signal is fed to the amplifier 47 which drives the capstan motor and controls its rotational velocity. Thus, the capstan motor advances the tape a predetermined distance during each revolution of the head drum whereby the plurality of heads 16 accurately track the record tracks on the magnetic tape.

The effect of the system described is to cause the capstan 13 to revolve during reproduction in exactly the same relationship to the revolving drum 18, within narrow limits, as it did during the recording process. Once the drum is adjusted on the center of a track at the beginning of a reproduction, the system automatically holds the relationship constant and the recording heads indefinitely track accurately the recorded transverse tracks. A suitable control system is described in copending application Serial No. 506,182, filed May 5, 1955.

As previously described, time displacement errors may be introduced by variation in torque loads applied to the rotating structure. These variations in load arise from variations in friction of the recording heads across the magnetic tape, variations in friction on the motor bearings, and variations in friction in the slip ring assembly. These torque loads are impulse loads, for example, when the heads strike the magnetic tape. The rotor of the synchronous motor may be considered as a torsional pendulum with the restoring force provided by the magnetic field in which the rotor is immersed. In one particular system, considering the assembly in the foregoing manner, one type of motor used in the apparatus was found to have a mechanical resonance frequency of approximately 12 cycles per second. The surface of the steel rotor was plated with approximately 2 mills thickness of copper and the damping factor was considerably improved thereby easing the problem of securing adequate phase margin when the motor was used as part of a feedback system. The effects of varying torque loads due to bearings and brushes were minimized by giving careful attention to the concentricity and surface condition of the slip ring assemblies and by dynamically balancing the entire rotating assembly of the motor.

Further reduction of timing errors is achieved by making the motor part of a servo loop as schematically illustrated in FIGURE 1. The instantaneous angular velocity of the head is measured by projecting a light from a light source 54 onto a rotating tachometer disc 56 which is attached to the face of the rotating drum assembly or which may be otherwise mounted to rotate at the speed of the drum. The reflected light is intercepted by a photosensitive element 57 and applied to an amplifier 58 which produces an amplified signal.

The amplified signal is applied to a phase detector 59. The $\phi$ of the signal derived from the tachometer disc corresponds to the instantaneous position of the head drum. It is compared in the phase detector to the reference frequency 36. For example, the frequency 36 may be multiplied by multiplier 61, applied to an amplifier 62 and compared in the phase comparator. The output of the phase comparator is an error signal which is dependent upon the phase difference between the applied signals. A suitable frequency sensitive network 63 serves to receive the error signal from the phase detector and apply the same to an amplifier 64. The output of the amplifier is applied to the eddy current brake designated generally by the reference numeral 66. The eddy current brake serves to increase or decrease torque loads on the motor in response to the error signal to maintain a constant angular velocity.

Figure 8:
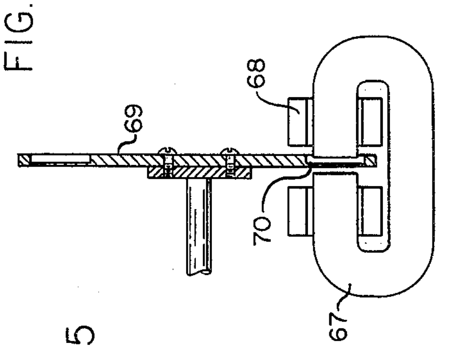
FIGURE 8 is an enlarged view showing an eddy current brake suitable for use in the apparatus.

Referring to FIGURE 8, the brake may, for example, comprise a core 67 having windings 68. The core is provided with a gap which bridges a conductive disk 69. Thus, a portion of the disk rotates in the gap of the magnetic circuit which is excited by the brake windings. The efficiency of the eddy current brake is dependent mainly upon the length of the gap in the magnetic circuit. It is desirable to reduce the distance between the rotating disk and the iron core to as small a value as practicable to improve the efficiency. In one particular example, the disk was made of 40 mil copper, 1¾ inches in diameter. A channel 70 was machined near the rim of the copper disk leaving a total thickness of 10 mils at the bottom of the channel. This portion of the disk rotated in the magnetic field produced in a 15 mil gap in the iron core. The windings consisted of 1800 turns of No. 36 wire.

The design criteria is briefly as follows: For rapid response, the magnetic circuit should have low eddy current losses. Commercial toroidal and rectangular cores of ferrite and wound magnetic alloy ribbon are found to be suitable. The optimum thickness $t$ of the disk is calculated using the length of the core and the permeability, and the smallest value of the gap $d$ consistent with machining and bearing tolerances. The value of $t$ or the closest practical value from a mechanical standpoint is then used to calculate the resistance in ohms per unit square of cross section of the conducting material. The value of B is then calculated for maximum required power dissipation in the brake. If this value is consistent with B-maximum of the core, the magnetizing field in ampere turns is calculated from the parameters of the magnetic circuit.

Figure 5:
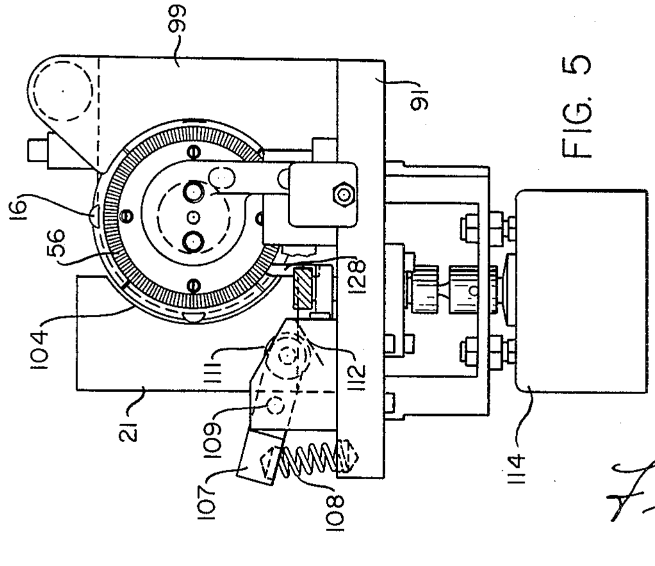
FIGURE 5 is a sectional view taken along the line 5—5 of FIGURE 4.

As described, a signal having a frequency proportional to the angular velocity of the heads is derived and compared in the phase comparator 59. Optical methods for deriving such a signal may be used. For example, a tachometer disk 56 such as that illustrated in FIGURES 1 and 5 is attached to the outboard face of the rotating head assembly and the line structure on the periphery of this disk is scanned by an optical system which produces an A.-C. output signal from a photoelectric cell. The phase of the signal gives information as to the angular position of the head with respect to the reference signal of the system.

Selection of the number of lines required on a tachometer disk is dictated by the rate at which information as to the head position is required, by the relative ease of utilizing the frequency generated by the disk, and by the gain obtainable in the phase detector circuit.

An approximate solution of the differential equations of the synchronous motor rotor considered as a torsional pendulum will indicate the departure of the rotor from the desired position as caused by instantaneous torque peaks of the maximum allowable amplitude. Although information rate is a prime factor, the frequency generated by the disk is essentially a carrier frequency phase modulated by the error motion of the rotating head. Therefore, the higher the carrier frequency, the smaller will be the percent bandwidth required for a given magnitude of error, and, therefore, a higher carrier may ease design problems in the phase detector and amplifier circuits.

Position error information contained in the signal obtained from the tachometer disk can be recovered quite simply if the frequency of the signal is an integral multiple of one of the frequencies available by dividing or multiplying the 3.58 mc. signal. With some increase in circuit complexity, the error information can be obtained from a tachometer disk frequency which is a simple rational multiple of one of the standard clock frequencies.

A simple equation $f_t=N_d f_m$ gives the frequency generated by the tachometer disk, where $N_d$ is the number of radial divisions on the disk and $f_m$ is the motor drive frequency. In addition, if $f_m=240$ c.p.s., $f_t=N_d\,8/525\,f_h$ relates the tachometer frequency to the horizontal repetition frequency; and $f_t=N_d\times 16\,(525\times 455)$ where $f_{sc}$ is the color subcarrier frequency, relates the tachometer frequency to the color subcarrier or primary system timing frequency. Examination of the numerical factors in the above equations shows that certain choices of $N_d$ may be made which make $f_t$ an integral multiple of $f_h$. These choices include figures such as 525 and 2625. It is also possible as can be seen from the equations to make disks which give an output frequency having a relationship of $$\frac{16}{N}$$

to the color subcarrier frequency, but which are not simple multiples of the horizontal repetition frequency. For example, disks having 3,185 lines would produce a frequency equal to $$\frac{16}{75}$$

of the color subcarrier frequency.

The lines may be engraved or embossed on the metallic plates, or directly on the rotating head assembly. However, it is possible to use a photographic process to produce the lines and thereby provide flexibility in manufacture and inexpensive reproduction of disks once a satisfactory negative has been made.

Figure 9:
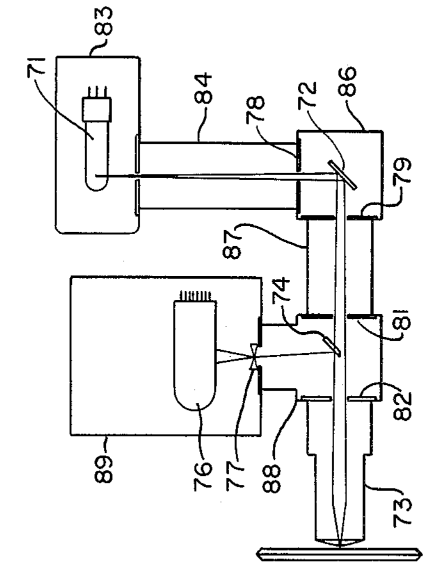
FIGURE 9 is a schematic illustration of an optical system for deriving a signal having a frequency corresponding to the speed of rotation of the rotary head assembly.
Figure 6:
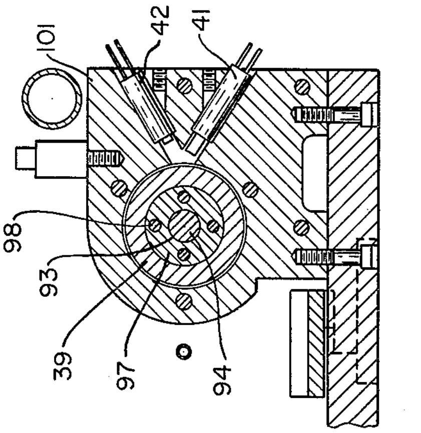
FIGURE 6 is a sectional view taken along the line 6—6 of FIGURE 4.

A suitable optical scanning system for acting in cooperation with the tachometer disk should have a relatively narrow spot and should provide a high signal to noise ratio. A suitable system is illustrated in FIGURE 9. A straight coil filament lamp bulb 71 of the type used for illuminating motion picture sound tracks is used as the light source and is supplied with D.-C. power. The light output from the light source 71 is reflected on a front surface mirror 72 and projected through a suitable microscope objective lens 73, schematically illustrated. For example, an 8 mm. microscope objective lens was found to be suitable. The image reduction is approximately 25 times resulting in an illuminated spot of reduced size. Half of the total light available is prevented from reaching the disk by a 45° mirror 74 covering half the lens aperture. Assuming a lens transmission factor of 80% and a filament luminance of 500,000 ft. lamberts, the illumination on the tachometer disk is approximately 50,000 ft. candles. A portion of the light reflected from the tachometer disk is collected by the same lens and is deviated 90° towards the photomultiplier tube 76 by the mirror 74. Since this light is converging towards a relatively small image, a small diverging lens 77 is placed just ahead of the photomultiplier tube and spreads the beam to better utilize the photocathode area and make positioning of the photomultiplier tube less critical. Background noise caused by scattering of the light is reduced by employing the apertures 78, 79, 81 and 82 which act as optical stops passing only the beam.

Assuming a perfectly diffusing, 50% reflectance surface for the bars of the tachometer disk, the amount of modulated light directed towards the phototube is of the order of 1.75 millilumens, enough to provide a clean signal. Approximately 0.2 volts peak to peak signal output may be achieved by employing a 931–A tube as the photomultiplier tube 76. The final anode load on such a tube is approximately 8000 ohms, and operating voltage is approximately 900 volts. All the optic elements are suitably enclosed. Thus, the light source 71 is housed within a housing 83, a tube 84 connects the housing 86 for the mirror 72, and a suitable tube 87 connects the housing 86 to the housing 88 which houses the mirror 74. A suitable housing 89 encloses the photomultiplier tube described.

Figure 3:
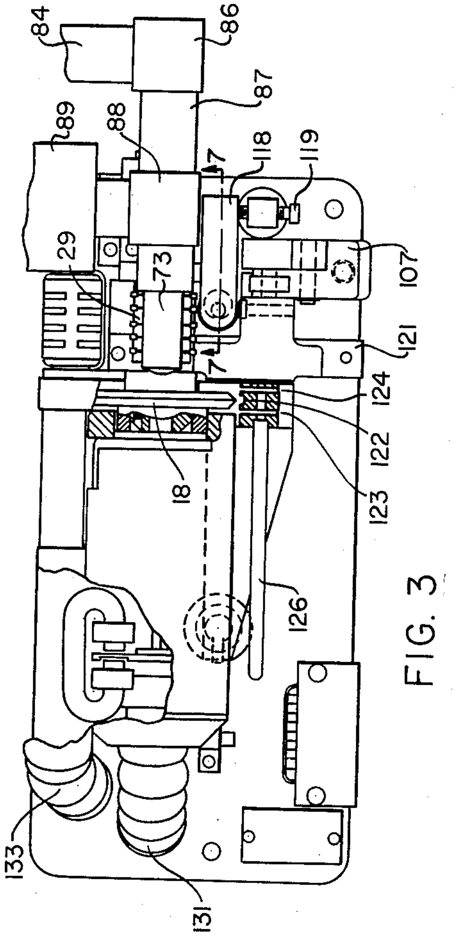
FIGURE 3 is a plan view illustrating tape transducing apparatus incorporating the invention.
Figure 4:
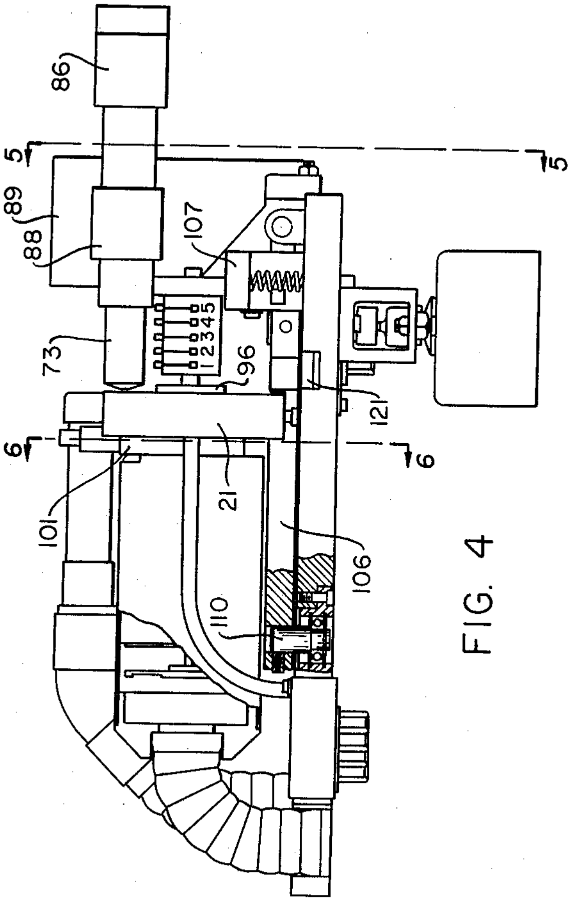
FIGURE 4 is a side elevational view illustrating the apparatus of FIGURE 3.

The positioning of the various elements is illustrated in FIGURES 2, 3 and 4. The amplifier 58, phase detector 59, multiplier 61 and amplifier 62 will presently be described in detail with respect to FIGURE 10. Basically, the functions of this system are to amplify the photomultiplier output signal, generate a clock controlled reference signal, and generate a position error signal by comparing the phase of these two signals.

The error signal is applied to the network 63 and amplifier 64. In the design of the network 63 and amplifier 64, the frequency response of the network is relatively important. This can usually be calculated by knowing the transfer characteristics of the motor and control elements. However, in the case of a synchronous motor, accurate determination of these characteristics is extremely difficult. It has been found that it is possible to determine the torsional resonance point previously described and to design a feedback loop giving primary consideration to the resonance frequency of the rotor assembly and then determining by experiment the remaining portion of the feedback loop response.

Figures 13, 14:
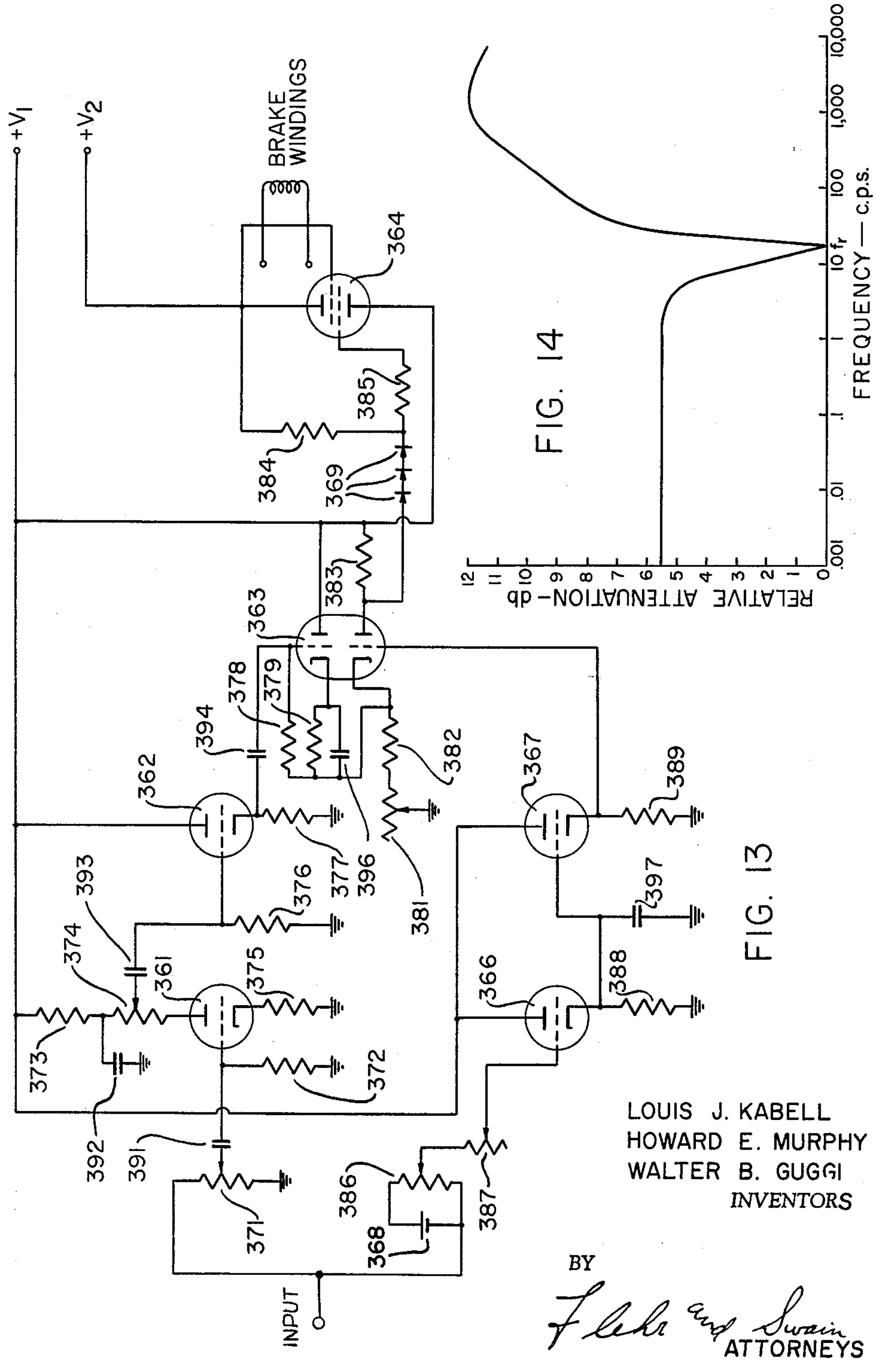
FIGURE 13 shows an amplifier and filter network for developing the eddy current brake control signal.
FIGURE 14 shows the response curve for the circuit of FIGURE 13.

In one example, rate feedback was applied to the system by closing the loop with a rising frequency response characteristic above the resonant frequency designated $f_R$, FIGURE 14, and with relatively high attenuation at the frequency $f_R$. This system introduces critical damping, and it is then possible to apply a D.-C. position feedback with a frequency cut-off characteristic below the resonance point having sufficient gain to provide regulation within the required tolerances.

The servo amplifier shown schematically in FIGURE 13 includes two channels, one covering the frequency range from D.-C. to a few cycles and one above the mechanical resonance of the system to several thousand cycles. Both channels are fed into an additive mixer which drives the output tube. The frequency response curve of FIGURE 14 is for a system of the type shown in FIGURE 13. The circuitry will presently be described in detail. It is, of course, apparent that the required transfer characteristics may be obtained by suitable filter networks.

The rotary head assembly, tape guide, rotary head drive, eddy current brake, and tachometer disk are illustrated in FIGURES 3–7. The head assembly, as previously described, includes a plurality of transducer units or heads 16 which are arranged on the periphery of a head disk or body 18. Along one side of a head assembly there is a tape guide 21 which is adapted to present the tape to the rotary head assembly. A base 91 serves to carry the operating parts and can be mounted on the top plates or panel 92 of a complete machine. The head assembly, as previously described, consists of a body 18 on which is mounted a plurality of transducer members 16 which protrude from the margins of the same. The body 18 may be formed of suitable rigid material or metal alloy. A central opening 93 accommodates the motor shaft 94. A more complete description of construction of a suitable head assembly is found in copending application Serial No. 689,594, filed Oct. 11, 1957.

The head assembly 12 is associated with a suitable slip ring assembly 29 whereby terminal leads 1–4, inclusive, make connection with one terminal each of the transducer windings. Lead No. 5 and the slip ring associated therewith are provided as a ground connection. The inner rotatable part of this slip ring assembly can be attached to a spider 96 and the spider together with the head member 97 on the motor shaft are all clamped together by means of screws 98. A part of the head periphery can be enclosed by a housing 99 which is carried on the base 91. The adjacent housing part 101 can serve to mount and enclose the photoelectric tube or photocell 41 and the lamp 42, together with means for focusing the same upon the periphery of the ring or disk 39 carried on the hub 97. As previously described, one portion of the periphery can be darkened, and the remainder be light reflecting whereby circuitry connected to the photoelectric tube serves to generate squarewave pulses in synchronism with rotation of the heads. Such pulses are then used for motor control and synchronizing operations as previously described.

The tape guide 21 is provided with an arcuate inner face 104 which embraces a portion of the periphery of the head assembly. It is fixed to an arm 106 which overlies the base 91 and which has one end removably attached to a pivot 110. The guide member 21 and the arm 106 are movable between limiting positions, in one of which the guide member is retracted with respect to the head assembly whereby the tape is free to move past the guide means without being contacted by a transducer unit, and the other in which the tape guide is advanced relative to the head whereby the tape is held in pressure contact with the transducer units or heads 16 carried by the head body 18.

Means is provided whereby the guide member 21 is normally urged towards the head assembly. Thus, a lever 107 is urged by a compression spring 108 and is secured to the base 91 by a pivot pin 109. A roller 111 is carried by one end of the lever and engages an inclined cam surface 112 formed on the extension of the arm 106. By virtue of the cam surface 112 and roller 111, the force of the spring normally serves to yieldably urge the arm and guide towards the head and downwardly towards the base 91. Suitably motive means such as a solenoid 114 of the rotary type is mounted below the base 91 and has its shaft coupled to the shaft 116 that is journalled within the base, and which has the stub shaft 117 eccentrically attached thereto. When the solenoid 114 is energized, the tape guide member 21 is in its advanced position, and the arm 118 is against the top screw 119. The solenoid is not energized, as for tape rewind operation, the arm 118 is rotated a limited amount in a counterclockwise direction as viewed in FIGURE 3, whereby the eccentricity between the shafts 116 and 117 cause displacement of the arm 118 with the result that the guide member is retracted for free movement of the tape with respect thereto.

When it is desired to remove the guide 21 together with the arm 106 from the machine, the operator operates the lever 107 to compress the spring 108 and release the roller 111 with respect to the cam surface 112. Thereafter, the arm can be removed together with the guide.

It is desirable to steady the arm 106 by supplemental means near its free end. It is also desirable to provide means for adjusting the vertical height of the guide means whereby the height of the arm may be controlled. For this purpose, a slide bar assembly 121 is fitted within accommodating slots formed in the base 91. The slide bar assembly has one of its ends fixedly secured to the base and the other end is adjustably secured to the base by means of a bolt which has differential thread engagement for adjustment of the height. Vertical movement of the slide bar serves to vertically position the arm which rests thereon. Teflon inserts may be provided on the slide bar for the purpose of providing smooth low friction suspension points on which the arm may move.

The arcuate surface 104 of the guide member 21 is preferably provided with an arrangement of grooving or recesses as shown in FIGURE 3. Thus, a groove 122 is formed in a plane corresponding to the plane of rotation of transducer unit 16. Additional grooves 123 and 124 are provided adjacent the sides of the grooves 122 and are adapted to be connected to a flexible tube 126 and to a source of suction. Suction applied during normal operation, that is, during recording or playback, serves to retain the exterior side of the tape in intimate contact with the guide surface. As shown in FIGURE 5, an abutment 18 is provided at the lower end of the guide member 21, and serves to engage one side edge of the tape. It is assumed in this instance that the head rotates in a counter-clockwise direction as viewed in FIGURE 5.

It is desirable to provide pneumatic cooling for the motor. A duct 131 connects with one end of the motor housing and is connected to a suitable source of suction whereby cooling air is continuously drawn through the motor windings. It is also desirable to provide pneumatic means for withdrawing dust from the tape and from the vicinity of the rotating heads. For this purpose, the housing part 99 is hollow and is connected to a similar suction duct 133 whereby air is continuously drawn from the region of contact between the head and tape thus removing dust and other fine particles from the operating region.

Operation of the apparatus as described is apparent from the foregoing. During normal recording and/or playback operation, the guide is advanced towards the head, the precise position being determined by the screw 119. The positioning controls the contact pressure between the tape and transducer units. During transport or tape rewind operations, the solenoid 114 is de-energized to retract the guide member whereby the tape is free to move.

As previously described, the lower portion of FIGURE 1 includes the signal electronic circuitry. The only connection between the signal electronics and the control electronics is the output filter 49 connected to the switcher 141. The signal from the filter 49 is employed to control the switching from one head (transducer) 16 to the next during reproduction to form a composite signal corresponding to the recorded signal.

The record electronics can consist of suitable means for producing a modulated carrier together with suitable recording amplifiers. FM recording is preferred, although AM may be used. Assuming the use of FM recording, the record electronics can include a modulator 142 which receives the input signal and a record amplifier 143 connected to receive the output of the modulator. The output from the record amplifier 143 is continuously applied to the individual head amplifiers 144—147. During recording, the switch 148 is positioned to connect the heads 1–4 to the amplifiers.

As described above, it is preferable to use FM recording. The type of FM recording which can be used for the recording of video images is disclosed in copending applications Serial No. 524,004, filed July 25, 1955, and Serial No. 552,868, filed Dec. 13, 1955.

During reproduction, the switch 148 is connected whereby the output of each head is fed individually to its own preamplifier 151—154. The preamplifiers are connected to feed their outputs to the switcher 141. From the switcher, a single channel frequency modulated signal (combined signal) is fed to the demodulator 156. The switcher serves to electronically switch to the individual outputs of the amplifiers 151—154 sequentially and alternately as the respective heads are swept across the tape. The output of the switcher is a composite signal corresponding to the recorded signal.

It is apparent that during reproduction it is necessary to derive the amplified output signal from one head at a time, switching from one preamplifier to the next at the moment in the signal when minimum disturbance will be introduced in the reproduced signal. An electronic switcher may be employed and may be of the type described in copending application Serial No. 614,420, filed Oct. 8, 1956. A blanking switcher 157 is employed in conjunction with the switcher 141 to provide automatic timing so that the switching transients occurs during horizontal retrace of the video signal thereby eliminating transients from the reproduced picture. The blanking switcher is controlled by a signal from the processing amplifier 158. A suitable blanking switcher is described in said copending applications.

The processing amplifier 158 is designed to make the final outputs of the video tape recorder acceptable for rebroadcast or retransmission. Its main purpose is to eliminate objectionable noise from the blanking and synchronizing pulses; and to limit to specified peak levels any noise during the picture intervals. The processing amplifier, in addition, provides means for correcting video linearity, and local or remote control of both video and sync levels. A suitable processing amplifier is described in copending application Serial No. 636,536, filed January 28, 1957.

Referring to FIGURE 10, a circuit suitable for performing the functions of the amplifier 58, phase detector 59, multiplier 61 and amplifier 62 is described. The circuit derives a position error signal by comparing the phase of the amplified photomultiplier output with that of the clock controlled reference signal. Amplification of the photomultiplier signal is performed by the two-stage amplifier including the transistors 161 and 162. The tuned collector load of the transistor 162 is shunted by the base circuit of the same transistor so that the bandwidth of this amplifier is relatively wide.

Assuming a motor speed of 240 r.p.m. and a 525 line tachometer disk of the type previously described, the clock controlled reference signal is then required to have a frequency eight times the horizontal sync frequency. The easiest method of obtaining this frequency is to multiply the 31.5 kc. available from the standard color sync generator by 4. This clock controlled 31.5 kc. input is half-wave rectified by the diode 164 in the base circuit of the transistor 166 so that it has appreciable energy at its fourth harmonic. The fourth harmonic is amplified in the transistor 166 and is selected by the resonant collector load. The signal at its collector is capacitively coupled to the transistor 167 by an impedance transforming network. The transistor 167 acts as a tuned amplifier. The signal at its collector is a 126 kc. sinewave.

The transistor 163 is the phase detector circuit; it functions much like the familiar vacuum tube keyed rectifier with the base of the transistor driven hard enough that the collector circuit is essentially clamped at ground potential during negative peaks of the base signal. If the photomultiplier and reference signal are in phase, the negative peaks of the reference signal are clamped to ground by charging the capacitor between the collector of the transistor 167 and the diode 169. The D.-C. or average value of the clamped sinewave is equal to half the peak to peak magnitude of the sinewave. Since the clamping point on the collector wave is determined by the time when the base of the transistor 163 conducts, the D.-C. voltage at the collector of the transistor indicates the relative phase of the base and collector signals. The error signals at the collector of the transistor are transmitted through a low pass filter 165 and a trap 171 to the servo amplifier.

A head position error detecting circuit as shown in FIGURE 10 and described above was constructed in which the various components had the following values.

Applied voltage $V_1=-15$ volts

Transistors 161, 162, 163, 166 and 167 were known by manufacturer's as 2N140.

The diodes 164 and 169 were known by manufacturer's spec. as 1N100.

| Resistors: | Ohms |
|---|---|
| 173 | 1K |
| 174 | 1K |
| 176 | 10K |
| 177 | 5.1K |
| 178 | 1K |
| 179 | 6.2K |
| 181 | 15K |
| 182 | 1K |
| 183 | 33K |
| 184 | 5.1K |
| 185 | 5.1K |
| 187 | 2K |
| 188 | 10K |
| 189 | 5.1K |
| 191 | 1K |
| 192 | 1.3K |
| 193 | 6.2K |

| Capacitors: | | |
|---|---|---|
| 196 | mf | 0.1 |
| 197 | mf | .002 |
| 198 | mf | .05 |
| 199 | mf | .002 |
| 201 | mf | 0.5 |
| 202 | mmf | 470 |
| 203 | mf | .001 |
| 204 | mf | .00182 |
| 206 | mf | .0012 |
| 207 | mf | .003 |
| 208 | mf | .003 |
| 209 | mf | .01 |
| 211 | mf | 0.2 |
| 212 | mf | .01 |
| 213 | mf | .002 |
| 214 | mf | .5 |
| 216 | mf | .01 |

Inductors 217, 218, 219, 220, 222 were known by manufacturer's spec. as No. 10.

Inductor 221$=1mH$

A circuit in accordance with the foregoing was constructed and operated. The gain of the amplifier including the transistors 161 and 162 was about 50 db whereby an input of 10 millivolts peak to peak was sufficient to drive the detector circuit in the transistor 163. The filter 165 in accordance with the foregoing was a low pass filter and the trap 171 and was a 126 kc. trap to reduce the amount of the multiplied signal appearing in the output. It was found that at the 90° operating point the output D.-C. voltage to the servo amplifier was about 1.5 volts, and a maximum voltage to the servo amplifier was about 1.5 volts, and a maximum error voltage swing of ±1.25 volts was generated by a 45° phase shift in the signal derived from the tachometer disk.

A suitable phase controlled oscillator for developing the driving signal for the amplifier 38 is shown in FIGURE 11. The connection of the circuit is apparent and, therefore, a detailed description will not be given. In one particular example, a circuit was constructed in accordance with the FIGURE 11 in which the various components had the following values:

Applied voltage $+V=15$ volts; $-V=-15$ volts

| Transistors: | |
|---|---|
| 231 | 2N109 |
| 232 | TI904A |
| 233 | 2N104 |
| 234 | 2N104 |
| Diode | 1N100 |

| Resistors: | Ohms |
|---|---|
| 237 | 10K |
| 238 | 470K |
| 239 | 110K |
| 241 | 6.8K |
| 242 | 15K |
| 243 | 100K |
| 244 | 3.9K |
| 246 | 5K |
| 247 | 2.2K |
| 248 | 3.9K |
| 249 | 3.9K |
| 251 | 75K |

| Capacitors: | |
|---|---|
| 252 | 30 mf. |
| 253 | 30 mf. |
| 254 | 200 mf. |
| 255 | 5 mf. |
| 256 | .1 mf. |
| 257 | 5 mf. |
| 258 | is chosen to resonate at 240 cycles with the transformer **259**. |
| 261 | 1200 mf. |
| 262 | 40 mf. |
| 263 | 100 mf. |

| Inductors: | |
|---|---|
| 266 | 16 H. |
| 267 | known by manufacturer's spec. as VIC–14 |

Transformer 259–UTC 0–9

In the circuit just described, vertical synchronizing pulses are applied to the terminal 268. The transistor 231 is connected in a phase detector or keyed rectifier circuit. Transistor 232 is connected in a D.C. amplifier circuit. The transistor 234 is connected in an oscillator circuit in which the frequency of the oscillator is determined by adjusting the capacitor 261. The transistor 233 is connected in an amplifier circuit which acts as an isolation stage, and the 240 cycle output from the oscillator is obtained at the terminal 269 connected to the collector of the transistor.

Operation of the circuit is as follows: The phase detector acts much the same as a grid control vacuum tube rectifier. During vertical synchronizing pulse intervals, when the collector of the transistor 231 is driven negative, the base of the transistor may be either positive or negative depending on the phase of the oscillator signal. If the phase relationship is such that the base of the transistor is negative during the time of occurrence of the sync signal, the transistor will conduct and charge the capacitor towards ground. Then following the sync pulse, the input to the low pass filter will go positive and a positive D.C. voltage will be applied from the collector of the transistor 232 to the terminal 4 of the transformer 259. When magnitude of the signal will depend upon the phase difference between the base and collector signal, and will be almost zero when the base is positive while the collector is negative, since the transistor 231 is effectively open.

The error signal generated by the phase detector is transmitted through the filter network to the voltage amplifier 232. The particular network used is a low pass filter with a finite transmission beyond cut-off, and is designed to comprise between the filter that would give optimum pull in time for the oscillator with minimum transient hunting, and the filter that would give minimum amplitude modulation of the output signal.

The oscillator circuit utilizes the transistor 234 in a common base configuration with a tuned collector load and transformer feedback to the emitter. The frequency of this oscillator is varied by a change in the emitter bias current which is a function of the phase error signal. The oscillator output signal is taken from the terminal 4 to transformer 259 for both the phase detector and for the isolation amplifier. The isolation amplifier functions as a tuned filter to reduce harmonic distortion present in the oscillator output.

The above oscillator was suitable for furnishing a 15 volt peak to peak sinewave for the motor drive amplifier 38. The sinewave had a distortion of about 2% at 720 cycles, and 1% or less for each of the other higher harmonic frequency components. The 60 cycle component was about 0.1% of the 240 cycle signal applied to the drive motor.

Referring to FIGURE 12, a regenerative divider circuit for deriving the driving signal for the amplifier 38 is shown. The regenerative divider serves to receive a standard frequency from the television sync generator, for example, 31.5 kc., and convert it to the motor drive frequency (e.g. 240 c.p.s.). The required head motor drive signal is four times the vertical synchronizing frequency, said motor drive frequency being $$\frac{4}{525}$$

times the 31.5 kc. standard frequency. A regenerative divider circuit for multiplying the $$31.5 \text{ kc. by } \frac{4}{525}$$

is shown. The connections of the circuit are apparent from the figure.

Voltage $+V=150$ volts

Tubes:

| | |
|---|---|
| 271 | 6AU6 |
| 272 | 6BE6 |
| 273 | 6AU6 |
| 274 | 6AU6 |
| 275 | 6BE6 |
| 276 | 6AV6 |
| 277 | 6AV6 |
| 277*a* | |

Resistors:

| | | |
|---|---|---|
| 278 | | 1M |
| 279 | ohms | 2K |
| 280 | do | 150 |
| 281 | do | 150K |
| 282 | do | 39K |
| 282A | do | 75 |
| 283 | do | 4.7K |
| 284 | do | 1K |
| 285 | do | 510K |
| 286 | do | 510K |
| 287 | do | 4.7K |
| 288 | do | 150K |
| 289 | do | 39K |
| 291 | do | 75 |
| 292 | do | 1K |
| 293 | do | 510K |
| 294 | do | 510K |

| | | |
|---|---|---|
| 336 | do | 82K |
| 337 | do | 510K |
| 338 | do | 75K |
| 339 | do | 75K |

Capacitors:

| | | |
|---|---|---|
| 296 | mf | .001 |
| 297 | mf | 5 |
| 298 | mf | .47 |
| 299 | mmf | 1200 |
| 301 | mf | .001 |
| 302 | mf | .001 |
| 303 | mf | .025 |
| 304 | mmf | 1200 |
| 306 | mf | 5 |
| 307 | mf | 5 |
| 308 | mmf | 390 |
| 309 | mmf | 1200 |
| 311 | mmf | 390 |
| 312 | mf | .014 |
| 313 | mmf | 1200 |
| 314 | mf | .47 |
| 316 | mmf | 330 |
| 317 | mmf | 1200 |
| 318 | mf | .001 |
| 319A | mf | .001 |
| 319 | mf | .033 |
| 320 | mf | 5 |
| 321 | mf | 5 |
| 322 | mmf | 1200 |
| 323 | mmf | 390 |
| 324 | mmf | 1200 |
| 325 | mmf | 390 |
| 326 | mf | .02 |
| 327 | mmf | 1200 |
| 328 | mmf | 330 |
| 329 | mf | 0.47 |
| 330 | mf | 50 |
| 331 | mf | .14 |
| 332 | mf | 1 |
| 333 | mf | 0.1 |

Inductors:

| | | |
|---|---|---|
| 341 | mH | 25 |
| 342 | mH | 500 |
| 344 | mH | 25 |
| 346 | mH | 25 |
| 347 | mH | 500 |
| 348 | mH | 25 |
| 349 | mH | 50 |
| 351 | mH | 25 |
| 352 | mH | 5 |
| 353 | | |

Operation of the foregoing circuit is briefly as follows: The divider receives the incoming signal 31.5 kc. at the terminal 356. The signal may either be a sinewave or a pulse train. The signal is amplified and filtered in the combination including the tube 271. The output of this amplifier is applied to the mixer tubes 272 and 275. Mixer tube 272 has as its inputs 31.5 kc. and (20/21)× 31.5 kc. Its plate load is tuned to the lower sideband of the modulation components of the two frequencies, or (1/21) (31.5 kc.)=1.5 kc. The 1.5 kc. signal is successively multiplied by 4 and by 5 in the multipliers including the tubes 273 and 274 to give a signal of (1/21) (4) (5) (31.5 kc.)=(20/21) (31.5 kc.=30 kc. which is then used as the second input to the mixer tube 272. To prevent oscillation at 30 kc., it is necessary to trap the 30 kc. signal present at the plate of the tube 272. The capacitor 309 and inductor 344 act as the trap.

The lower divider circuitry consisting of the tubes 275, 276 and 277 perform the same function as the tubes 272, 273 and 274 except that the signal derived in this chain is (1/25) (31.5 kc.)=1.26 kc., and the multiplication factors are 4 and 6. The output mixer, the tube **277*a*** has as a plate load a parallel tuned circuit that selects the lower sideband of the modulation product of the two signals generated in the divider circuits. This lower sideband is equal to (1/21) (31.5)−(1/25) (31.5)=(4/525) (31.5)=240 c.p.s. Since the next lowest frequency that may appear at the plate of the tube is 1.2 kc., a simple low pass filter in the output is sufficient to reduce distortion in the 240 cycle signal.

Referring to FIGURE 13, a suitable servo amplifier and filter network, blocks 63 and 64 of FIGURE 1, is illustrated. The circuit connections are apparent from the drawing. In one particular example, a circuit was constructed in accordance with the foregoing in which the various components had values as follows:

Voltage $+V_1$=165 volts
$+V_2$=410 volts

| | |
|---|---|
| Tubes: | |
| **361** | 6C4 |
| **362** | 6C4 |
| **363** | 12AT7 |
| **364** | EL34 |
| **366** | 6C4 |
| **367** | 6C4 |
| Battery: | |
| **368** volts | 1.5 |
| Diodes: | |
| **369** | ZA35 |
| Resistors: | |
| **371** | .5M |
| **372** | .5M |
| **373** ohms | 1200K |
| **374** ohms | 3.9K |
| **375** ohms | 3.7K |
| **376** | .5M |
| **377** ohms | 120K |
| **378** | .5M |
| **379** ohms | 390 |
| **381** ohms | 2500 |
| **382** ohms | 1500 |
| **383** ohms | 50K |
| **384** ohms | 370K |
| **385** ohms | 100K |
| **386** ohms | 10K |
| **387** | .5M |
| **388** ohms | 20K |
| **389** ohms | 120K |
| Capacitors: | |
| **391** mf | .047 |
| **392** mf | 60 |
| **393** mf | .1 |
| **394** mf | .003 |
| **396** mf | 50 |
| **397** mf | 1 |

The servo amplifier illustrated includes two channels: one covering the frequency range from D.-C. to a few cycles and including the tubes 366 and 367, and one from above mechanical resonance to several thousand cycles including the tubes 361 and 362. Both channels are fed into an additive mixer which includes the tube 363 and which drives the output tube 364. The circuit employs two RC networks separated by individual tubes. The capacitor 391, resistor 372, capacitor 393, resistor 376, capacitor 394, resistor 378, resistor 379, capacitor 396, and capacitor 397 are the frequency determining elements of the network. Linear amplification is provided throughout the system except for these frequency determining networks. A circuit in accordance with the foregoing was constructed and the frequency response curve of FIGURE 14 is indicative of the operating characteristics of the circuit. The frequency $f_r$, of FIGURE 14, is chosen as the tortional resonance of the rotary assembly of the synchronous motor 19 (FIGURE 1). Consequently, the output of the amplifier provides current to the hysteresis brake with critical damping.

We claim:

1. In a magnetic tape apparatus, at least one transducer unit, rotary means for mounting said unit, guide means serving to guide magnetic tape whereby it is presented for contact with the transducer unit, motive means serving to drive said rotary means, means for deriving a signal having a substantially constant frequency, power amplifying means serving to receive said signal and to provide power for driving the motive means, means for deriving a signal which is indicative of the speed of rotation of said rotary means, means serving to receive said signal and to form a control signal, and means responsive to said control signal serving to apply a torque load to said motive means whereby the motive means has a substantially constant torque applied thereto.

2. Apparatus as in claim 1 in which said means for deriving the signal frequency comprises a phase controlled oscillator.

3. Apparatus as in claim 1 wherein said means for deriving the constant frequency signal comprises a regenerative divider.

4. In magnetic tape apparatus of the type in which one or more transducer units are mounted on rotary means for movement in circular sweep paths, motive means serving to drive said rotary means, means for guiding the tape past the transducer units whereby the transducer units successively sweep across the tape, and a feedback servo system including means for deriving a signal which is indicative of the speed of rotation of said rotary unit, means serving to receive said signal and forming a control signal, means associated with the motive means connected to receive the control signal and serving to apply a torque load dependent upon the control signal to said motive means and including means having a predetermined frequency response whereby the control signal corresponding to the mechanical resonance of the system is rejected.

5. In magnetic tape apparatus of the type in which one or more transducer units are mounted on a rotary means for movement in circular paths to sweep across a magnetic tape presented thereto, motive means serving to drive said rotary means, means for deriving a signal having a substantially constant frequency, power amplifying means serving to receive said signal and provide power for driving the motive means, means for deriving a signal which is indicative of the speed of rotation of said rotary means, a first amplifier serving to receive the signal indicative of speed of rotation, a second amplifier serving to receive the signal of constant frequency, a transistor connected as a phase detector circuit serving to receive outputs of said first and second amplifiers and provide a signal proportional to phase difference, a filter serving to receive said proportional signal, an amplifier serving to receive and amplify the output of the filter, and an eddy current brake serving to receive the output of the amplifier and control the torque load applied to the motive means.

6. Apparatus as in claim 5 wherein said means for deriving the signal of substantially constant frequency comprises a phase controlled oscillator.

7. Apparatus as in claim 5, wherein said means for deriving the signal of substantially constant frequency comprises a regenerative divider.

8. Apparatus as in claim 4 in which the means having a predetermined frequency response is further defined as an amplifier having first and second channels with the first channel amplifying signals in a frequency band below the inherent resonant frequency and with the second channel amplifying signals having a frequency above the inherent resonant frequency.

9. Apparatus as in claim 8 in which the frequency band amplified by the first channel extends from D.C. to the inherent resonant frequency and the frequencies amplified by the second channel extends from the inherent resonant frequency to a few thousand cycles thereabove.

References Cited in the file of this patent

UNITED STATES PATENTS

| | | |
|---|---|---|
| 2,253,575 | Norton | Aug. 26, 1941 |
| 2,370,637 | Charchison | Mar. 6, 1945 |
| 2,715,202 | Turner et al. | Aug. 9, 1955 |
| 2,769,949 | Stratton | Nov. 6, 1956 |
| 2,796,572 | Tallant | June 18, 1957 |
| 2,876,295 | Irby | Mar. 3, 1959 |
| 2,922,099 | Gardiner | Jan. 19, 1960 |
| 2,944,108 | Houghton | July 5, 1960 |
| 2,954,441 | Anderson | Sept. 27, 1960 |

OTHER REFERENCES

Meagher: Television Tape Recording System, RCA Technical Note No. 6.